(12) United States Patent
Fujii et al.

(10) Patent No.: US 11,379,224 B2
(45) Date of Patent: Jul. 5, 2022

(54) SCALE CALCULATION APPARATUS AND COMPUTER READABLE MEDIUM

(71) Applicant: Mitsubishi Electric Corporation, Tokyo (JP)

(72) Inventors: Natsuko Fujii, Tokyo (JP); Toshihiro Kobayashi, Tokyo (JP); Yuki Hikawa, Tokyo (JP); Takahiro Akimoto, Tokyo (JP); Satoshi Maekawa, Tokyo (JP); Toshiki Kitajima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 320 days.

(21) Appl. No.: 16/473,855

(22) PCT Filed: Feb. 16, 2017

(86) PCT No.: PCT/JP2017/005666
§ 371 (c)(1),
(2) Date: Jun. 26, 2019

(87) PCT Pub. No.: WO2018/150505
PCT Pub. Date: Aug. 23, 2018

(65) Prior Publication Data
US 2021/0326130 A1    Oct. 21, 2021

(51) Int. Cl.
*G06F 8/72* (2018.01)
*G06F 8/41* (2018.01)

(52) U.S. Cl.
CPC .............. *G06F 8/72* (2013.01); *G06F 8/433* (2013.01)

(58) Field of Classification Search
CPC .................................. G06F 8/72; G06F 8/433
See application file for complete search history.

(56) References Cited

U.S. PATENT DOCUMENTS 6,804,682 B1 *  10/2004  Kemper ................... G06F 8/72
9,740,480 B1 *   8/2017  Ghouti ..................... G06F 8/72
(Continued)

FOREIGN PATENT DOCUMENTS

JP     2003044275 A     2/2003
JP     2011170697 A     9/2011
(Continued)

OTHER PUBLICATIONS

Kallen et al., "Impact of Code Refactoring using Object-Oriented Methodology on a Scientific Computing Application" (Year: 2014).*
(Continued)

*Primary Examiner* — Phillip H Nguyen
(74) *Attorney, Agent, or Firm* — Buchanan Ingersoll & Rooney PC

(57) ABSTRACT

A source code analysis unit identifies dependency strengths of one or more functions included in a source code. An influence analysis unit identifies one or more transfer functions that will each move to a different subsystem due to refactoring and identifies a dependency strength to be influenced by the refactoring, based on the dependency strengths that have been identified by the source code analysis unit with respect to the one or more transfer functions. A scale calculation unit calculates the scale of the refactoring, based on the dependency strength to be influenced, which has been identified by the influence analysis unit.

13 Claims, 17 Drawing Sheets

(56) References Cited

U.S. PATENT DOCUMENTS

| | | | |
|---|---|---|---|
| 2003/0023406 A1 | 1/2003 | Kataoka | |
| 2004/0210421 A1 | 10/2004 | Kataoka | |
| 2006/0123384 A1* | 6/2006 | Nickell | G06F 8/72 717/100 |
| 2009/0013315 A1* | 1/2009 | Sharma | G06F 8/75 717/159 |
| 2010/0125824 A1* | 5/2010 | Kobayashi | G06F 8/72 717/110 |
| 2011/0035726 A1* | 2/2011 | Davies | G06F 8/71 717/110 |
| 2012/0174082 A1* | 7/2012 | Dolby | G06F 8/72 717/151 |
| 2016/0019609 A1 | 1/2016 | Miyazaki | |

FOREIGN PATENT DOCUMENTS

| | | |
|---|---|---|
| JP | 2013045421 A | 3/2013 |
| JP | 2013196433 A | 9/2013 |
| JP | 2014032466 A | 2/2014 |
| JP | 2014059775 A | 4/2014 |
| JP | 2014174728 A | 9/2014 |
| JP | 2016076080 A | 5/2016 |
| JP | 2016110330 A | 6/2016 |

OTHER PUBLICATIONS

Drofenik et al., "Improving Code Maintainability: A Case Study on the Impact of Refactoring" (Year: 2016).*

Office Action dated Oct. 29, 2019, issued in corresponding Japanese Patent Application No. 2019-500101, 7 pages including 4 pages of English translation.

International Search Report (PCT/ISA/210) with translation, and Written Opinion (PCT/ISA/237) mailed on Mar. 28, 2017, by the Japan Patent Office as the International Searching Authority for International Application No. PCT/JP2017/005666.

First Examination Report dated Jun. 17, 2021, issued in Corresponding United Kingdom Application No. 1908961.4, 3 pages.

* cited by examiner

Fig. 4

| S/W COMPONENT OF DEPENDENCY SOURCE | S/W COMPONENT OF DEPENDENCY DESTINATION | TYPE OF DEPENDENCY | DEPENDENCY STRENGTH |
|---|---|---|---|
| file1.c | file1.h | INCLUSION | 1 |
| file1.c/func_I_A() | file1.c/val_I | REFERERENCE TO VARIABLE | 1 |
| file1.c/func_I_B() | file1.h/MAX | MACRO | 1 |
| file1.c/func_I_B() | file1.c/func_I_A() | FUNCTION CALLING | 1 |
| file1.c/func_I_B() | file1.c/val_I | REFERERENCE TO VARIABLE | 2 |
| file2.c | file1.h | INCLUSION | 1 |
| file2.c/func_II_C() | file1.c/func_I_A() | FUNCTION CALLING | 1 |

Fig. 5

| FUNCTION | DEPENDENCY CAUSING STRENGTH | CAUSED DEPENDENCY STRENGTH |
|---|---|---|
| file1.c/func_I_A() | 1 | 2 |
| file1.c/func_I_B() | 4 | 0 |
| file2.c/func_II_C() | 1 | 0 |

| FUNCTION | SUBSYSTEM |
|---|---|
| file1.c/func_I_A() | SUBSYSTEM I |
| file1.c/func_I_B() | SUBSYSTEM I |
| file2.c/func_II_C() | SUBSYSTEM II |

Fig. 7

| FUNCTION | SUBSYSTEM |
|---|---|
| file1.c/func_I_A() | SUBSYSTEM I I |
| file1.c/func_I_B() | SUBSYSTEM I |
| file2.c/func_II_C() | SUBSYSTEM I I |

| TOTAL OF DEPENDENCY CAUSING STRENGTHS | TOTAL OF CAUSED DEPENDENCY STRENGTHS |
|---|---|
| 1 | 2 |

| S/W COMPONENT OF DEPENDENCY SOURCE | S/W COMPONENT OF DEPENDENCY DESTINATION | DEPENDENCY STRENGTH |
|---|---|---|
| SUBSYSTEM I | SUBSYSTEM II | 0 |
| SUBSYSTEM II | SUBSYSTEM I | 2 |

| S/W COMPONENT OF DEPENDENCY SOURCE | S/W COMPONENT OF DEPENDENCY DESTINATION | DEPENDENCY STRENGTH |
|---|---|---|
| SUBSYSTEM I | SUBSYSTEM II | 1 |
| SUBSYSTEM II | SUBSYSTEM I | 2 |

| FUNCTION | DEPENDENCY CAUSING STRENGTH | CAUSED DEPENDENCY STRENGTH |
|---|---|---|
| file1.c/func_1_A() | 1 | 2 |

41

SCALE CALCULATION APPARATUS AND COMPUTER READABLE MEDIUM

TECHNICAL FIELD

The present invention relates to a technology for estimating the scale of refactoring of software (hereinafter referred to as S/W).

BACKGROUND ART

Repeated diversion of a source code makes an S/W structure become different from an initially assumed S/W structure and become complicated, due to source code addition. In order to adjust the S/W structure that has become complicated, refactoring for improving an S/W internal structure without altering the external behavior of S/W is carried out.

Before the refactoring is carried out, it is necessary to calculate the scale of modification needed for the refactoring and assess cost-effectiveness. The scale of the refactoring is the number of source code lines, the number of manhours for development that are necessary for the modification, and so on.

As a method of estimating the scale of the refactoring, there is a method using a function point method or a WBS (Work Breakdown Structure) based on a past experience. In this method, however, it is difficult for a person other than a skilled person to perform accurate estimation. Further, due to complication and an increase in the size of the S/W, it is difficult to manually estimate the scale of modification for a large volume of source code.

There is a method whereby the scale of modification is mechanically estimated from design information. Patent Literatures 1 and 2 each describe a method of calculating the total of scales of modules that may be affected by modification, based on a dependency for each model.

CITATION LIST

Patent Literature

Patent Literature 1: JP 2013-45421 A
Patent Literature 2: JP 2013-196433 A

SUMMARY OF INVENTION

Technical Problem

In the method described in each of Patent Literatures 1 and 2, however, the estimation based on the scale of each module can just be performed. An object of the present invention is to enable appropriate estimation of the scale of refactoring.

Solution to Problem

A scale calculation apparatus according to the present invention may include:

a source code analysis unit to identify dependency strengths of one or more functions included in a source code;

an influence analysis unit to identify one or more transfer functions that will each move to a different subsystem due to refactoring and identify a dependency strength to be influenced by the refactoring, based on the dependency strengths that have been identified by the source code analysis unit with respect to the one or more transfer functions; and a scale calculation unit to calculate a scale of the refactoring, based on the dependency strength to be influenced, which has been identified by the influence analysis unit.

Advantageous Effects of Invention

In the present invention, the scale of the refactoring is estimated, using the dependency strengths between the S/W functions. This enables appropriate estimation of the scale of the refactoring.

BRIEF DESCRIPTION OF DRAWINGS

FIG. 4 is a table illustrating examples of dependencies between S/W components of the source code 31 illustrated in FIG. 3.

FIG. 5 is a table illustrating a function dependency strength correspondence table 32 of the source code 31 illustrated in FIG. 3, according to the first embodiment.

FIG. 6 is a table illustrating a former function-subsystem correspondence table 33 of the source code 31 illustrated in FIG. 3, according to the first embodiment.

FIG. 7 is a table illustrating a latter function-subsystem correspondence table 34 generated from the former function-subsystem correspondence table 33 illustrated in FIG. 6, according to the first embodiment.

FIG. 8 is a table illustrating an influence dependency strength table 35, based on the latter function-subsystem correspondence table 34 illustrated in FIG. 7, according to the first embodiment.

FIG. 13 is a table illustrating a former inter-subsystem dependency table 38 of the source code 31 illustrated in FIG. 3, according to the second embodiment.

FIG. 14 is a table illustrating a latter inter-subsystem dependency table 39, based on the source code 31 illustrated in FIG. 3 and the latter function-subsystem correspondence table 34 illustrated in FIG. 7, according to the second embodiment.

FIG. 16 is a table illustrating a function influence dependency strength table 41 based on the latter function-subsystem correspondence table 34 illustrated in FIG. 7, according to the third embodiment.

DESCRIPTION OF EMBODIMENTS

First Embodiment

**\*\*\*Description of Configuration\*\*\***

Figure 1:
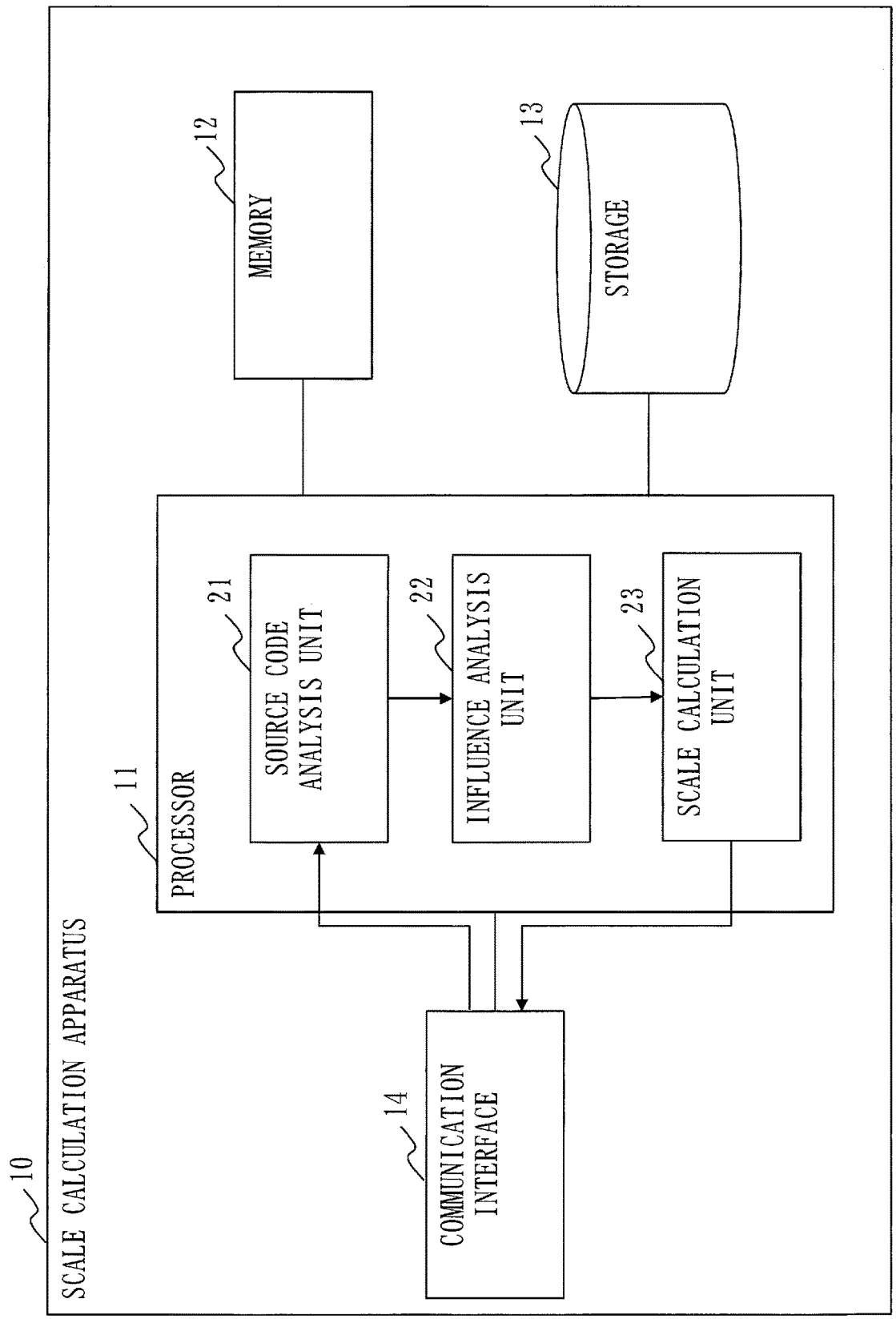
FIG. 1 is a configuration diagram of a scale calculation apparatus 10 according to a first embodiment.

A configuration of a scale calculation apparatus 10 according to a first embodiment will be described with reference to FIG. 1.

The scale calculation apparatus 10 is a computer.

The scale calculation apparatus 10 includes hardware such as a processor 11, memory 12, a storage 13, and a communication interface 14. The processor 11 is connected to the other software via signal lines and controls these other hardware. The processor 11 is an IC (Integrated Circuit) to perform processing. As a specific example, the processor 11 is a CPU (Central Processing Unit), a DSP (Digital Signal Processor), or a GPU (Graphics Processing Unit).

The memory 12 is a storage device to temporarily store data. As a specific example, the memory 12 is an SRAM (Static Random Access Memory) or a DRAM (Dynamic Random Access Memory).

The storage 13 is a storage device to hold data. As a specific example, the storage 13 is an HDD (Hard Disk Drive). Alternatively, the storage 13 may be a portable storage medium such as an SD (registered trademark, Secure Digital) memory card, a CF (CompactFlash), a NAND flash, a flexible disk, an optical disk, a compact disk, a blue ray (registered trademark) disk, or a DVD (Digital Versatile Disk).

The communication interface 14 is an interface for performing communication with an external apparatus. As a specific example, the communication interface 14 is an Ethernet (registered trademark) port, a USB (Universal Serial Bus) port, or an HDMI (trademark, High-Definition Multimedia Interface) port.

The scale calculation apparatus 10 includes a source code analysis unit 21, an influence analysis unit 22, and a scale calculation unit 23, as functional components. Functions of the source code analysis unit 21, the influence analysis unit 22, and the scale calculation unit 23 are implemented by software.

A program to implement the functions of the source code analysis unit 21, the influence analysis unit 22, and the scale calculation unit 23 is stored in the storage 13. This program is loaded into the memory 12 by the processor 11 and is implemented by the processor 11. This implements the functions of the source code analysis unit 21, the influence analysis unit 22, and the scale calculation unit 23.

FIG. 1 illustrates only one processor 11. The scale calculation apparatus 10 may, however, include a plurality of processors that substitute the processor 11. These plurality of processors share execution of the program to implement the functions of the source code analysis unit 21, the influence analysis unit 22, and the scale calculation unit 23. Each processor is an IC to perform processing, like the processor 11.

**\*\*\*Description of Operations\*\*\***

Figure 2:
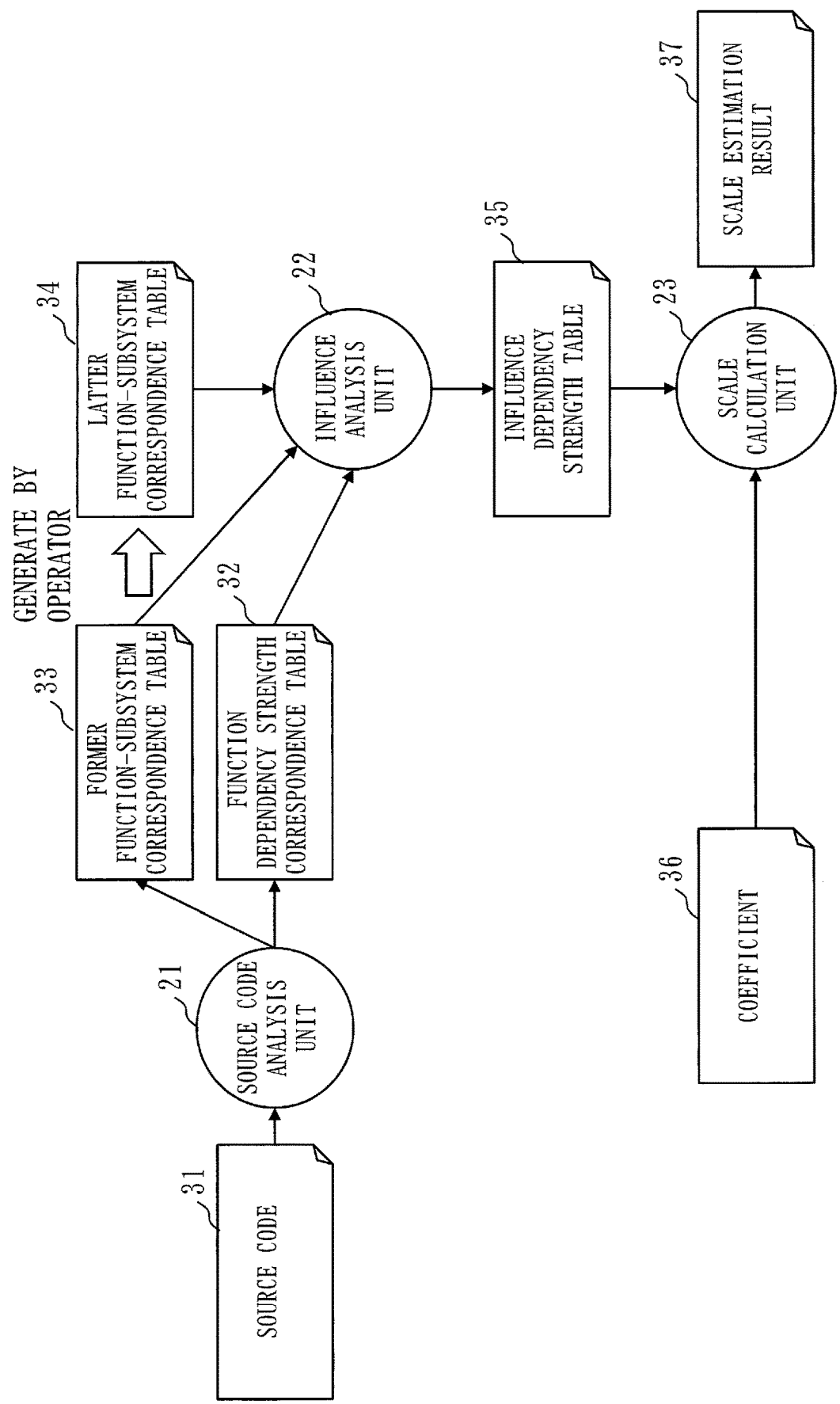
FIG. 2 is a diagram illustrating operation flows of the scale calculation apparatus 10 according to the first embodiment.

Operations of the scale calculation apparatus 10 according to the first embodiment will be described with reference to FIG. 2.

The operations of the scale calculation apparatus 10 according to the first embodiment correspond to a scale calculation method according to the first embodiment. Alternatively, the operations of the scale calculation apparatus 10 according to the first embodiment correspond to processes of a scale calculation program according to the first embodiment.

<Processes of Source Code Analysis Unit 21>

The source code analysis unit 21 accepts an input of a source code 31 via the communication interface 14 and writes the source code 31 into the memory 12. The source code analysis unit 21 extracts dependencies between S/W components from the accepted source code 31. Then, the source code analysis unit 21 totals one or more dependency strengths for each function included in the source code 31, thereby generating a function dependency strength correspondence table 32 indicating dependency strengths of each function. Further, the source code analysis unit 21 generates a former function-subsystem correspondence table 33 indicating a subsystem associated with each function. The source code analysis unit 21 writes the function dependency strength correspondence table 32 and the former function-subsystem correspondence table 33 into the memory 12.

The source code 31 is a string of characters that provides basis for S/W or a computer program. That is, the source code 31 is the one in which a sequence of instructions for a computer are described. Each S/W component is an element described in the source code. Each S/W component is a function, a variable, a file, or a macro, for example. The dependencies between the S/W components are relationships that have been defined between the S/W components. The dependencies between the S/W components are an inclusion, a calling of a macro and a function, a writing to a variable, and a reference to a variable, for example. The dependency strength is the number of times at which dependency is executed.

A process of generating the function dependency strength correspondence table 32 will be described with reference to FIGS. 3 to 5.

Figure 3:
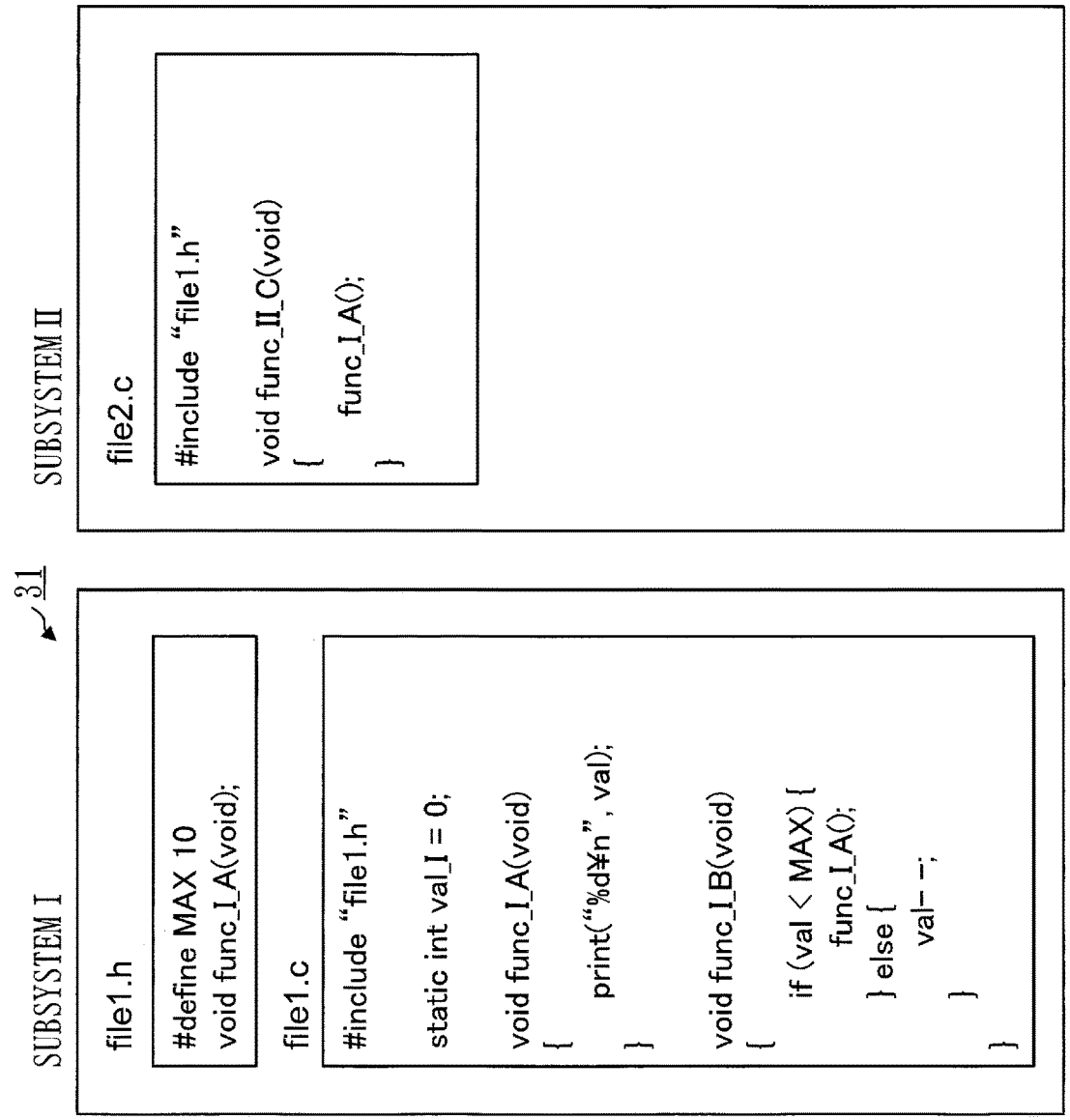
FIG. 3 is a diagram illustrating an example of a source code 31 according to the first embodiment.

First, the source code analysis unit 21 extracts, from the source code 31 illustrated in FIG. 3, each dependency between the S/W components illustrated in FIG. 4.

As illustrated in FIG. 4, each dependency between the S/W components indicates the S/W component of a dependency destination, the type of the dependency, and the dependency strength, for each S/W component of a dependency source.

As a specific example, a first line in FIG. 4 indicates that, in the source code 31 illustrated in FIG. 3, the dependency strength is 1 for the dependency of a file file1. c on a file file1. h of the dependency type "inclusion". The file file1. c is the S/W component of the dependency source, and the file file1. h is the S/W component of the dependency destination. A fifth line in FIG. 4 indicates that, in the source code 31 illustrated in FIG. 3, the dependency strength is 2 for the dependency of a function_I_B( ) of the file file1. c on a variable val_I of the file file1. c of the dependency type "reference to a variable". The function func_I_B( ) of the file file1. c is the S/W component of the dependency source, and the variable val_I of the file file1. c is the S/W component of the dependency destination.

Subsequently, the source code analysis unit 21 totals, for each function, the one or more dependency strengths based on each dependency between the S/W components illustrated in FIG. 4, thereby generating the function dependency strength correspondence table 32 illustrated in FIG. 5.

As illustrated in FIG. 5, the function dependency strength correspondence table 32 indicates, for each function, a dependency causing strength related to dependency causing of the function and a dependency strength related to caused dependency of the function. The dependency causing refers to a dependency in which a target S/W component becomes a dependency source. The caused dependency refers to a dependency in which the target S/W component becomes a dependency destination.

As a specific example, a second line in FIG. 5 indicates the dependency causing strength and the caused dependency strength of the function func_I_B( ) of the file file1. c. The function function_I_B( ) of the file file1. c is the dependency source in third, fourth, and fifth lines in FIG. 4. Therefore, the dependency causing strength of the function func_I_B( ) of the file filet. c is 4 obtained by adding together the dependency strengths in the third, fourth and fifth lines in FIG. 4. The function func_I_B( ) of the file file1. c is not the dependency destination in FIG. 4. Therefore, the caused dependency strength of the function func_I_B( ) of the file file1. c is 0.

A process of generating the former function-subsystem correspondence table 33 will be described with reference to FIGS. 3 and 6.

The source code analysis unit 21 extracts, from the source code 31 illustrated in FIG. 3, each function and a subsystem to which the function belongs, thereby generating the former function-subsystem correspondence table 33 illustrated in FIG. 6.

As illustrated in FIG. 6, the former function-subsystem correspondence table 33 indicates, for each function, the subsystem to which the function belongs. As a specific example, a first line in FIG. 6 indicates that a function func_I_A( ) of the file file1. c belongs to a subsystem I.

The source code analysis unit 21 may read from information described in a comment of the source code, information as to which subsystem each function belongs, or may generate the information as to which subsystem each function belongs, based on a rule related to correspondence between the function and the subsystem, which has been received from an outside. The rule related to the correspondence between the function and the subsystem is a correspondence table between a file to which the function belongs and the subsystem, for example.

<Processes of Influence Analysis Unit 22>

The influence analysis unit 22 identifies one or more transfer functions which are each a function that will move to a different subsystem by refactoring. Then, the influence analysis unit 22 generates an influence dependency strength table 35 indicating a dependency strength to be influenced by the refactoring, based on the dependency strengths that have been identified by the source code analysis unit 21 with respect to the one or more transfer functions.

Specifically, the influence analysis unit 22 reads, from the memory 12, the function dependency strength correspondence table 32, the former function-subsystem correspondence table 33, and a latter function-subsystem correspondence table 34 generated from the former function-subsystem correspondence table 33. The influence analysis unit 22 compares the former function-subsystem correspondence table 33 with the latter function-subsystem correspondence table 34 generated from the former function-subsystem correspondence table 33, thereby identifying the one or more transfer functions. Then, the influence analysis unit 22 identifies the dependency strength to be influenced by the refactoring with respect to the one or more transfer functions, based on the function dependency strength correspondence table 32 generated by the source code analysis unit 21, thereby generating the influence dependency strength table 35. The influence analysis unit 22 writes the generated influence dependency strength table 35 into the memory 12.

A process of identifying each of the one or more transfer functions will be described with reference to FIGS. 6 and 7.

By identifying a changed portion between the former function-subsystem correspondence table 33 illustrated in FIG. 6 and the latter function-subsystem correspondence table 34 illustrated in FIG. 7, the influence analysis unit 22 identifies each transfer function.

As illustrated in FIG. 7, the latter function-subsystem correspondence table 34 is a table that has been generated by changing a transfer source subsystem of each function that will move between the subsystems due to the refactoring to a transfer destination subsystem, based on the former function-subsystem correspondence table 33 illustrated in FIG. 6. The latter function-subsystem correspondence table 34 is generated by an operator or the like, according to contents of the refactoring. As a specific example, a first line in FIG. 7 indicates that the function func_I_A( ) of the file file1. c is moved to a subsystem II.

The latter function-subsystem correspondence table 34 may include information of the former function-subsystem correspondence table 33. When the latter function-subsystem correspondence table 34 includes the information of the former function-subsystem correspondence table 33, the influence analysis unit 22 can identify the one or more transfer functions by referring to the latter function-subsystem correspondence table 34 alone.

A process of generating the influence dependency strength table 35 will be described with reference to FIGS. 5 to 8.

The influence analysis unit 22 identifies a total of the dependency strengths that have been identified with respect to the one or more transfer functions, as the dependency strength to be influenced, thereby generating the influence dependency strength table 35.

As illustrated in FIG. 8, the influence dependency strength table 35 indicates a total of the caused dependency strengths and a total of the dependency causing strengths of the one or more transfer functions for which movements between the subsystems will occur.

As a specific example, only the function func_I_A( ) of the file file1. c is the transfer function to move between the subsystems, as seen from FIGS. 6 and 7. Therefore, the total of the dependency causing strengths becomes 1 that indicates the dependency causing strength of the function func_I_A( ) of the file file1. c in FIG. 5. Further, the total of the caused dependency strengths becomes 2 that indicates the caused dependency strength of the function func_I_A( ) of the file file1. c in FIG. 5.

<Processes of Scale Calculation Unit 23>

The scale calculation unit 23 calculates the scale of the refactoring, based on the dependency strength to be influenced, which has been identified by the influence analysis unit 22, thereby generating a scale estimation result 37 indicating the scale of the refactoring.

Specifically, the scale calculation unit 23 reads the influence dependency strength table 35 from the memory 12. The scale calculation unit 23 generates the scale estimation result 37 indicating the scale of the refactoring by multiplying by a coefficient 36, the dependency strength to be influenced, which is indicated by the influence dependency strength table 35. To take an example, the scale calculation unit 23 multiplies by the coefficient 36, each of the total of the caused dependency strengths and the total of the dependency causing strengths in the influence dependency strength table 35, thereby calculating the scale of the refactoring. The scale calculation unit 23 outputs the scale estimation result 37 via the communication interface 14.

The coefficient 36 is a value that is used to estimate the scale of the refactoring from the dependency strengths. The coefficient 36 may be set by the operator based on a past experience or may be calculated based on a result obtained by actually performing the refactoring on some samples. Different values may be set for each of the total of the caused dependency strengths and the total of the dependency causing strengths, as the coefficient 36.

\*\*\*Effect of First Embodiment\*\*\*

As described above, the scale calculation apparatus 10 according to the first embodiment estimates the scale of the refactoring, using the dependency strengths between the S/W functions. This makes it possible to estimate the scale of the refactoring for the source code 31 with a large size in a mechanical way and with high accuracy.

A relationship between the respective dependency strengths and the scale of the refactoring will be described with reference to FIGS. 3 and 9.

Figure 9:
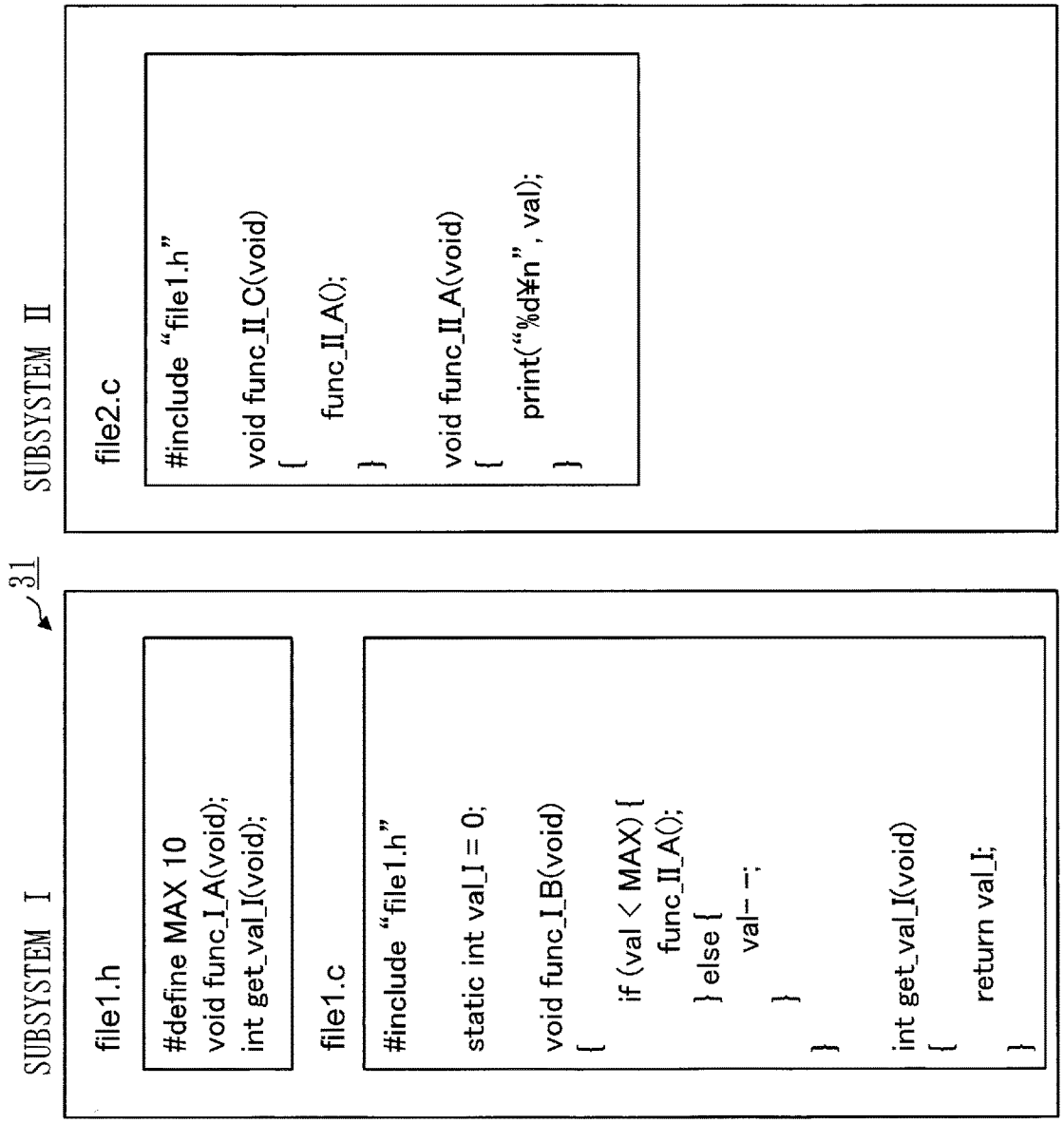
FIG. 9 is a diagram of a source code 31 after refactoring of the source code 31 illustrated in FIG. 3 according to the first embodiment.

A source code 31 after the refactoring illustrated in FIG. 9 and the source code 31 before the refactoring illustrated in FIG. 3 are compared. Then, in the source code 31 after the refactoring illustrated in FIG. 9, the function function_I_A( ) of the file file1. c in the subsystem I is moved to a file file2. c in the subsystem II. The function name of the function func_I_A( ) is changed to a func_II_A( ) because the function_I_A( ) has moved between the subsystems.

As a modification necessary for the refactoring, there is an interface change of the function func_I_A( ). This modification is performed for the total of two portions that are a portion of the function func_I_B( ) of the file filet. c that uses the function func_I_A( ) and a portion of a function func_II_C( ) of the file file2. c. The scale of this modification is considered to have a correlation with the caused dependency strength of the function func_I_A( ) in FIG. 5.

As a modification necessary for the refactoring, there is an interface change for access from the function func_II_A( ) to the static variable val_I of the file file1. c. Specifically, a function get val_I( ) of the file file1. c in FIG. 9 is generated, and a portion of the function func_II_A( ) is changed. The scale of this modification is considered to have a correlation with the dependency causing strength of the function func_I_A( ) in FIG. 5.

By expressing each of these correlations by the coefficient, the scale of the refactoring can be calculated from the dependency strengths.

\*\*\*Alternative Configuration\*\*\*

First Variation Example

In the first embodiment, the functions of the source code analysis unit 21, the influence analysis unit 22, and the scale calculation unit 23 of the scale calculation apparatus 10 have been implemented by the software. However, the functions of the source code analysis unit 21, the influence analysis unit 22, and the scale calculation unit 23 of the scale calculation apparatus 10 may be implemented by hardware, as a first variation example. A difference of this first variation example from the first embodiment will be described.

Figure 10:
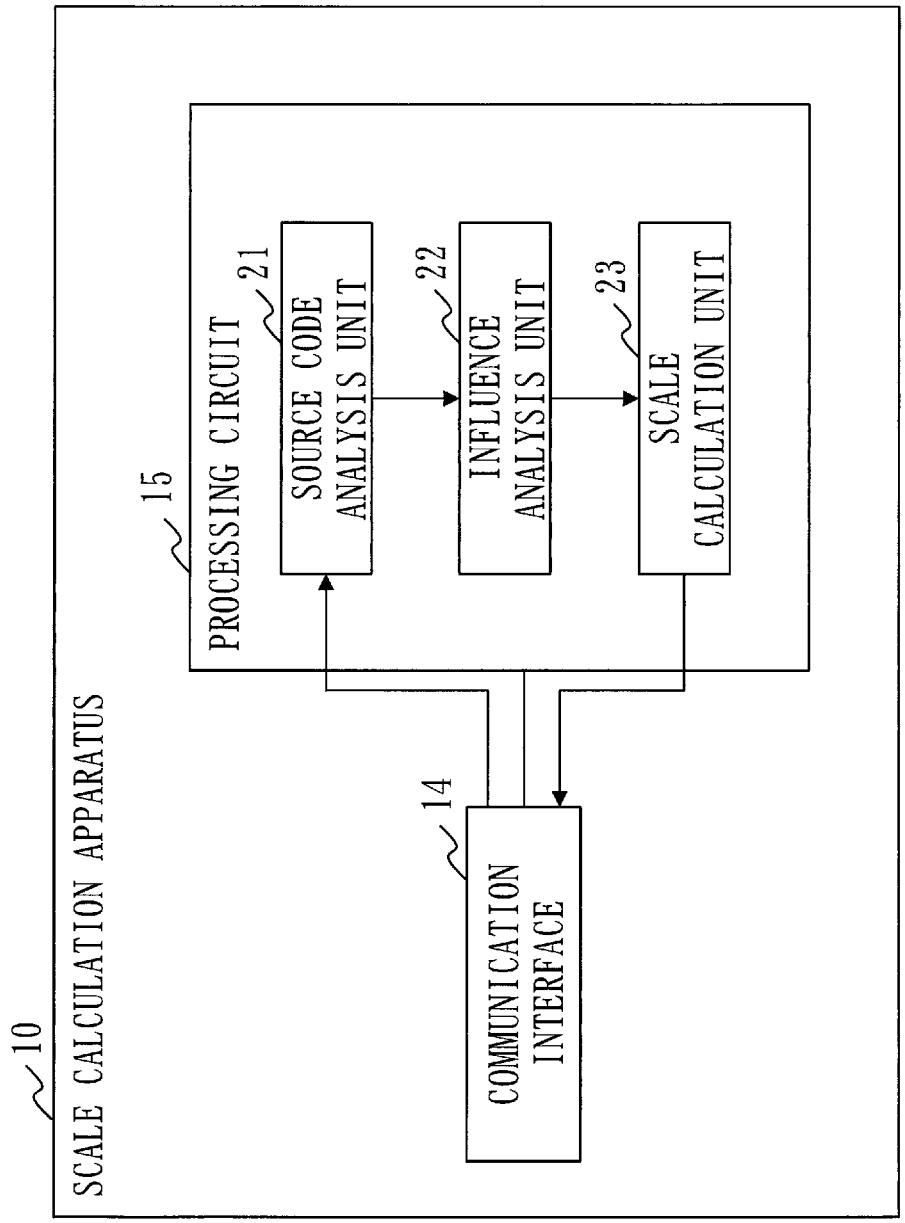
FIG. 10 is a configuration diagram of the scale calculation apparatus 10 according to a first variation example.

A configuration of the scale calculation apparatus 10 according to the first variation example will be described with reference to FIG. 10.

When the functions of the source code analysis unit 21, the influence analysis unit 22, and the scale calculation unit 23 are implemented by the hardware, the scale calculation apparatus 10 includes a processing circuit 15 in place of the processor 11, the memory 12, and the storage 13. The processing circuit 15 is a dedicated electronic circuit to implement the functions of the source code analysis unit 21, the influence analysis unit 22, and the scale calculation unit 23 and functions of the memory 12 and the storage 13.

As the processing circuit 15, a single circuit, a composite circuit, a programmed processor, a parallel-programmed processor, a logic IC, a GA (Gate Array), an ASIC (Application Specific Integrated Circuit), or an FPGA (Field-Programmable Gate Array) is assumed.

The functions of the source code analysis unit 21, the influence analysis unit 22, and the scale calculation unit 23 may be implemented by one processing circuit 15 or may be distributed into a plurality of the processing circuits 15 and implemented.

Second Variation Example

As a second variation example, a part of the functions may be implemented by hardware, and the other functions may be implemented by software. That is, the part of the functions of the source code analysis unit 21, the influence analysis unit 22, and the scale calculation unit 23 may be implemented by the hardware, and the other functions may be implemented by the software.

The processor 11, the memory 12, the storage 13, and the processing circuit 15 may be collectively referred to as "processing circuitry". That is, the function of each functional component is implemented by the processing circuitry.

Second Embodiment

A second embodiment is different from the first embodiment in that an effect of refactoring is calculated. In the second embodiment, this difference will be described, and description of the same respects as those in the first embodiment will be omitted.

\*\*\*Description of Configuration\*\*\*

Figure 11:
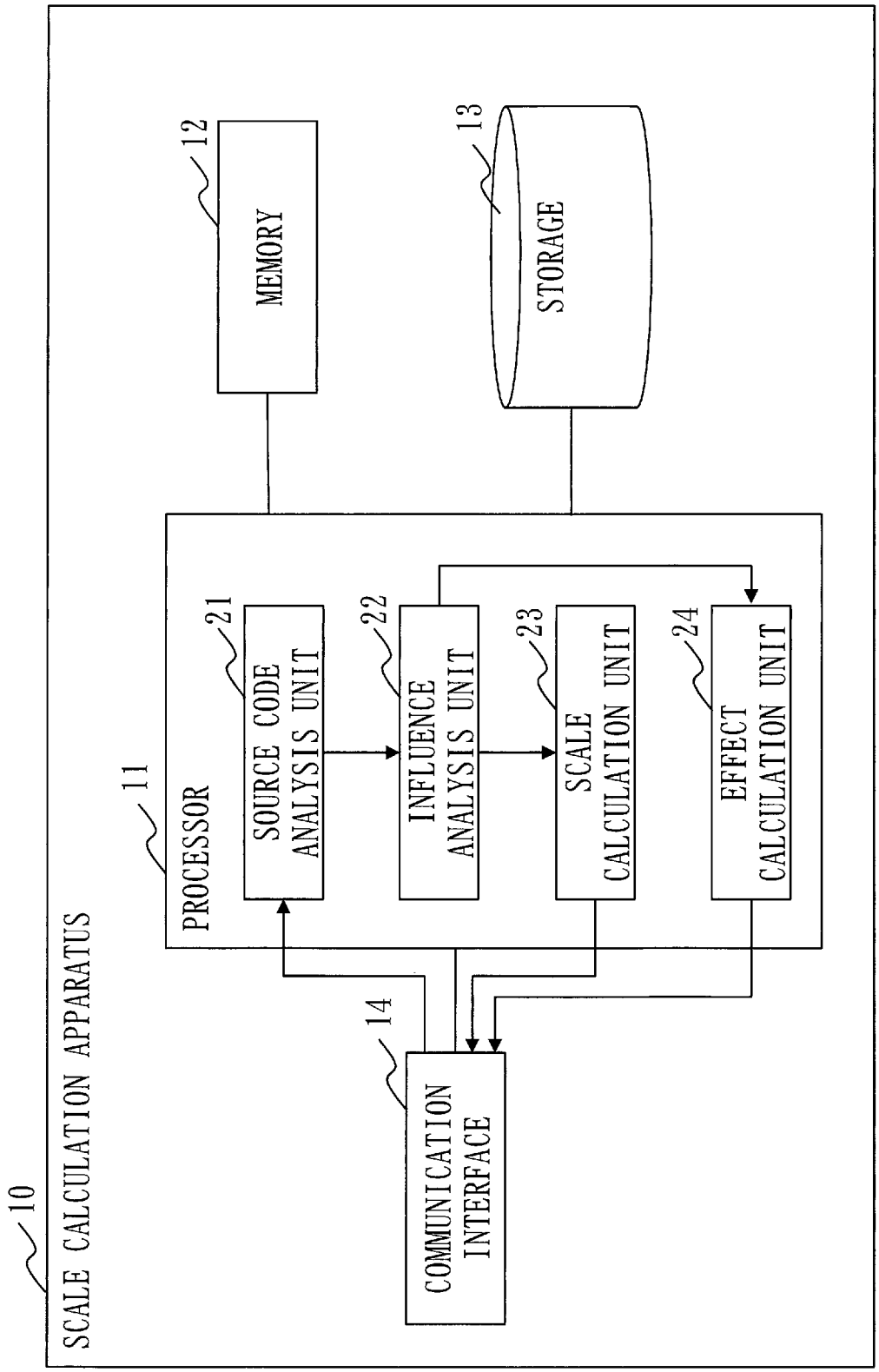
FIG. 11 is a configuration diagram of a scale calculation apparatus 10 according to a second embodiment.

A configuration of a scale calculation apparatus 10 according to the second embodiment will be described with reference to FIG. 11.

The scale calculation apparatus 10 is different from the scale calculation apparatus 10 illustrated in FIG. 1 in that the scale calculation apparatus 10 includes an effect calculation unit 24. The effect calculation unit 24 is implemented by software, like the other functional components. The effect calculation unit 24 may be implemented by hardware as well, like the other functional components.

\*\*\*Description of Operations\*\*\*

Figure 12:
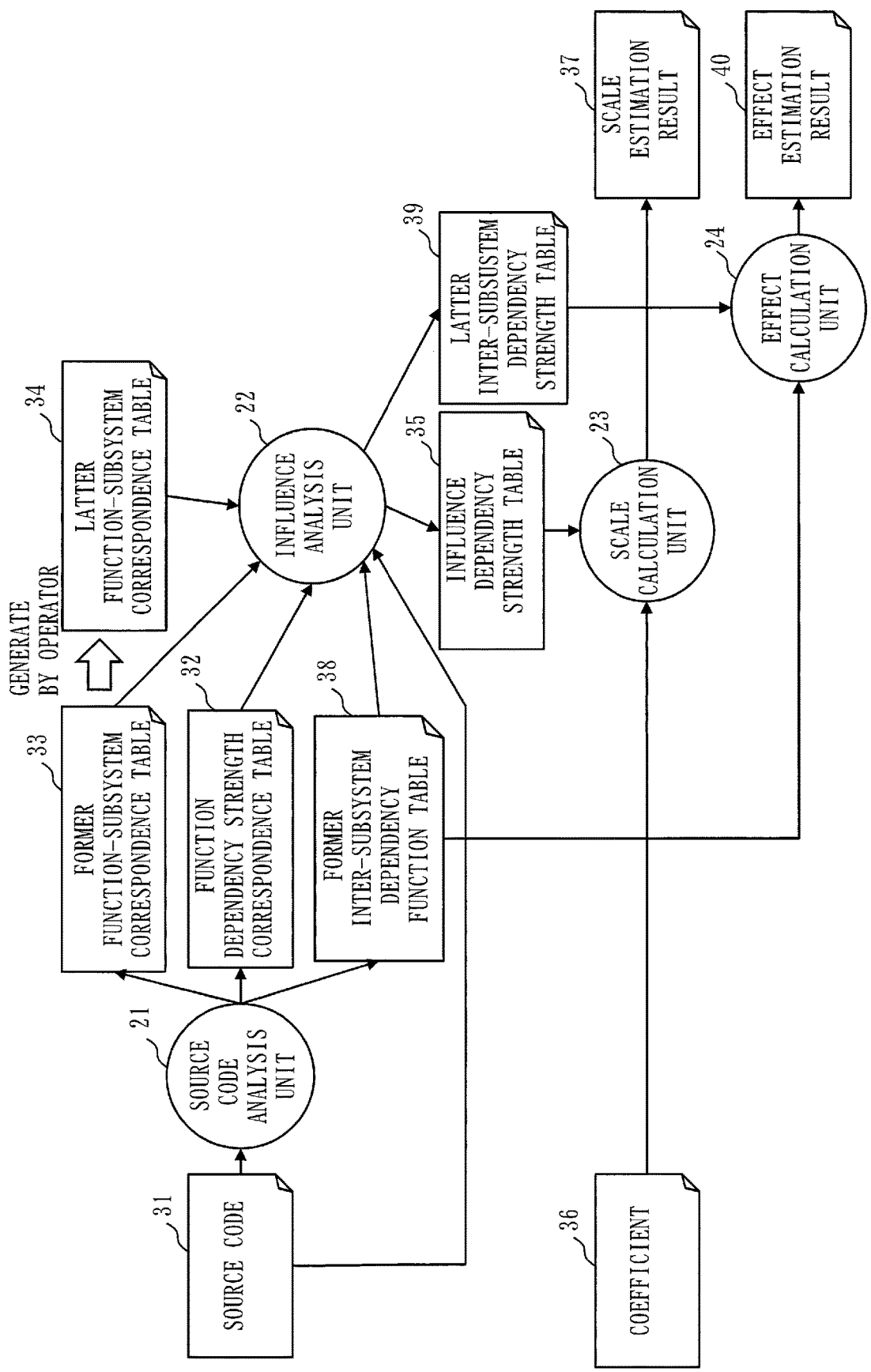
FIG. 12 is a diagram illustrating operation flows of the scale calculation apparatus 10 according to the second embodiment.

Operations of the scale calculation apparatus 10 according to the second embodiment will be described with reference to FIG. 12.

The operations of the scale calculation apparatus 10 according to the second embodiment correspond to a scale calculation method according to the second embodiment. The operations of the scale calculation apparatus 10 according to the second embodiment correspond to processes of a scale calculation program according to the second embodiment.

<Processes of Source Code Analysis Unit 21>

The source code analysis unit 21 generates a former inter-subsystem dependency table 38, in addition to the function dependency strength correspondence table 32 and the former function-subsystem correspondence table 33. The source code analysis unit 21 identifies, from the source code 31 illustrated in FIG. 3, a dependency and a dependency strength between respective subsystems with respect to each S/W component, thereby generating the former inter-subsystem dependency table 38 illustrated in FIG. 13.

Specifically, the source code analysis unit 21 extracts each S/W component of a dependency source subsystem that depends on an S/W component of a dependency destination subsystem, using each subsystem of the source code 31 as a dependency source and using each subsystem other than the dependency source as a dependency destination. The source code analysis unit 21 identifies a total of a dependency strength of each extracted S/W component as the dependency strength of the dependency source subsystem for the dependency destination subsystem. The source code analysis unit 21 generates the former inter-subsystem dependency table 38 indicating identified dependency strengths between the respective subsystems. The source code analysis unit 21 writes the generated former inter-subsystem dependency table 38 into the memory 12.

As illustrated in FIG. 13, the former inter-subsystem dependency table 38 indicates the dependency source subsystem, the dependency destination subsystem, and the dependency strength. As a specific example, a second line in FIG. 13 indicates that the dependency strength from the subsystem II to the subsystem I is 2. The dependency strength in the second line in FIG. 13 is the total of the dependency strength of each S/W component of the subsystem II that depends on the S/W component of the subsystem I. Accordingly, the dependency strength in the second line in FIG. 13 corresponds to the total of the dependency strengths in sixth and seventh lines in FIG. 4.

<Processes of Influence Analysis Unit 22>

The influence analysis unit 22 generates a latter inter-subsystem dependency table 39, in addition to the influence dependency strength table 35. The influence analysis unit 22 identifies a dependency and a dependency strength between the respective subsystems with respect to each S/W component after the refactoring, based on the source code 31 and the former inter-subsystem dependency table 38, thereby generating the latter inter-subsystem dependency table 39.

Specifically, the influence analysis unit 22 reads the source code 31 and the former inter-subsystem dependency table 38 from the memory 12 and duplicates the former inter-subsystem dependency table 38, as the latter inter-subsystem dependency table 39. The influence analysis unit 22 performs the following processes (1) to (4), thereby generating the latter inter-subsystem dependency table 39. The influence analysis unit 22 writes the generated latter inter-subsystem dependency table 39 into the memory 12.

(1) For each subsystem (target subsystem), the influence analysis unit 22 identifies, from the source code 31, a number N1 of the S/W components of the target subsystem on which the S/W components of one or more transfer functions depend before movements of the one or more transfer functions. The influence analysis unit 22 reduces dependency strengths from the subsystem to which the one or more transfer functions belong to the target subsystem before the movements, indicated by the latter inter-subsystem dependency table 39, just by the identified number N1.

(2) For each subsystem (target subsystem), the influence analysis unit 22 identifies a number N2 of the S/W components of the one or more transfer functions on which the S/W components of the target subsystem depend before the movements of the one or more transfer functions. The influence analysis unit 22 reduces dependency strengths from the target subsystem to the subsystem to which the one or more transfer functions belong before the movements, indicated by the latter inter-subsystem dependency table 39, just by the identified number N2.

(3) For each subsystem (target subsystem), the influence analysis unit 22 identifies, from the source code 31, a number N3 of the S/W components of the target subsystem on which the S/W components of the one or more transfer functions will depend after the movements of the one or more transfer functions. The influence analysis unit 22 increases the dependency strengths from the subsystem to which the one or more transfer functions will belong to the target system after the movements, indicated by the latter inter-subsystem dependency table 39, just by the identified number N3.

(4) For each subsystem (target subsystem), the influence analysis unit 22 identifies a number N4 of the S/W components of the one or more transfer functions on which the S/W components of the target subsystem will depend after the movements of the one or more transfer functions. The influence analysis unit 22 increases the dependency strengths from the target subsystem to the subsystem to which the one or more transfer functions will belong after the movements, indicated by the latter inter-subsystem dependency table 39, just by the identified number N4.

When the refactoring in accordance with the latter function-subsystem correspondence table 34 illustrated in FIG. 7 is performed on the source code 31 illustrated in FIG. 3, as illustrated in FIG. 14, the dependency strength from the subsystem I to the subsystem II has become 1. That is, while the dependency strength of the subsystem I for the subsystem II has been 0 in the former inter-subsystem dependency table 38 illustrated in FIG. 13, the dependency strength of the subsystem I for the subsystem II has increased by 1 in FIG. 14.

This is because, the function funcI_A( ) has moved from the subsystem I to the subsystem II due to the refactoring. Specifically, the dependency strength of 1 of the subsystem I for the subsystem II corresponds to the dependency strength of 1 from the function funcI_B( ) of the file file1.c to the function funcII_A( ) of the file file2.c in the source code 31 after the refactoring, illustrated in FIG. 9.

<Processes of Effect Calculation Unit 24>

The effect calculation unit 24 generates an effect estimation result 40 indicating the effect of the refactoring, based on the dependency strengths between the respective subsystems before the refactoring and the dependency strengths between the respective subsystems after the refactoring.

Specifically, the effect calculation unit 24 reads, from the memory 12, the former inter-subsystem dependency table 38 and the latter inter-subsystem dependency table 39. The effect calculation unit 24 calculates a comparison result or a difference between the dependency strengths between the respective subsystems before the refactoring indicated by the former inter-subsystem dependency table 38 and the dependency strengths between the respective subsystems after the refactoring indicated by the latter inter-subsystem dependency table 39, as the effect of the refactoring. The effect calculation unit 24 generates the effect estimation result 40 indicating the calculated effect of the refactoring. The effect calculation unit 24 outputs the generated effect estimation result 40 via the communication interface 14.

\*\*\*Effect of Second Embodiment\*\*\*

As described above, the scale calculation apparatus 10 according to the second embodiment estimates the effect of the refactoring, using the dependency strengths between respective S/W functions. This enables calculation of cost-effectiveness of the refactoring.

Third Embodiment

A third embodiment is different from the first embodiment in that the scale of refactoring for each function is calculated. In the third embodiment, this difference will be described, and description of the same respects as those in the first embodiment will be omitted.

\*\*\*Description of Operations\*\*\*

Figure 15:
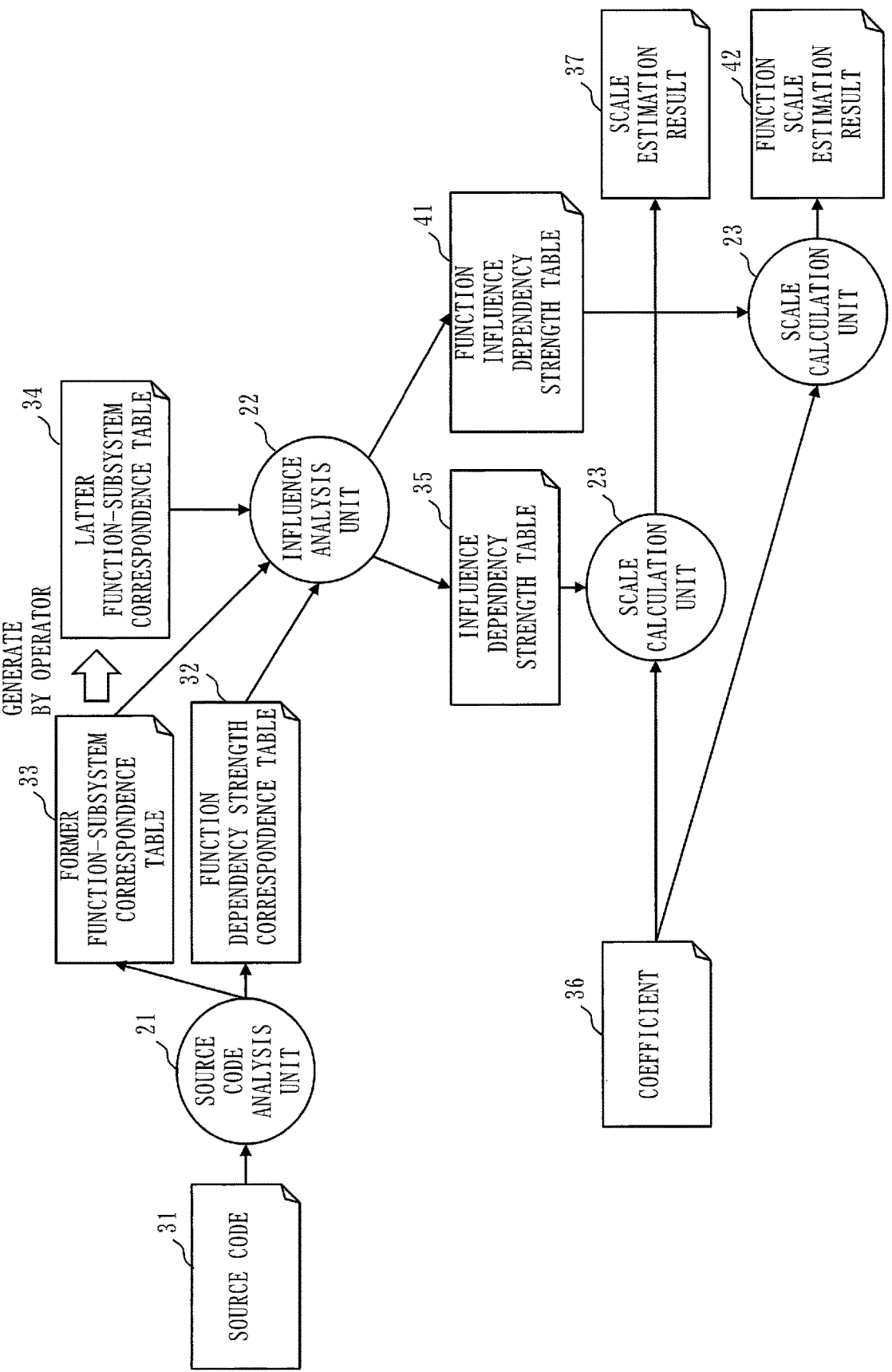
FIG. 15 is a diagram illustrating operation flows of a scale calculation apparatus 10 according to a third embodiment.

Operations of a scale calculation apparatus 10 according to the third embodiment will be described with reference to FIG. 15.

The operations of the scale calculation apparatus 10 according to the third embodiment correspond to a scale calculation method according to the third embodiment. The operations of the scale calculation apparatus 10 according to the third embodiment correspond to processes of a scale calculation program according to the third embodiment.

<Processes of Influence Analysis Unit 22>

The influence analysis unit 22 generates a function influence dependency strength table 41 indicating, for each function, a dependency strength to be influenced by the refactoring, in addition to the influence dependency strength table 35.

Specifically, as illustrated in FIG. 16, the influence analysis unit 22 extracts rows of one or more transfer functions from the function dependency strength correspondence table 32, thereby generating the function influence dependency strength table 41. The influence analysis unit 22 writes the generated function influence dependency strength table 41 into the memory 12.

<Processes of Scale Calculation Unit 23>

The scale calculation unit 23 generates a function scale estimation result 42 indicating the scale of the refactoring for each function, in addition to the scale estimation result 37.

Specifically, the scale calculation unit 23 reads the function influence dependency strength table 41 from the memory 12. The scale calculation unit 23 multiplies by the coefficient 36, the dependency strength for each function indicated by the function influence dependency strength table 41, thereby generating the function scale estimation result 42 indicating the scale of the refactoring for each function.

\*\*\*Effect of Third Embodiment\*\*\*

As described above, the scale calculation apparatus 10 according to the third embodiment calculates the scale of the refactoring for each function. This enables narrowing down of one or more functions to be subject to the refactoring.

Fourth Embodiment

A fourth embodiment is different from the first embodiment in that the scale of refactoring is calculated for each of a plurality of refactoring patterns. In the fourth embodiment, this difference will be described, and description of the same respects as those in the first embodiment will be omitted.

\*\*\*Description of Operations\*\*\*

Operations of a scale calculation apparatus 10 according to the fourth embodiment will be described with reference to FIG. 17.

The operations of the scale calculation apparatus 10 according to the fourth embodiment correspond to a scale calculation method according to the fourth embodiment. The operations of the scale calculation apparatus 10 according to the fourth embodiment correspond to processes of a scale calculation program according to the fourth embodiment.

Figure 17:
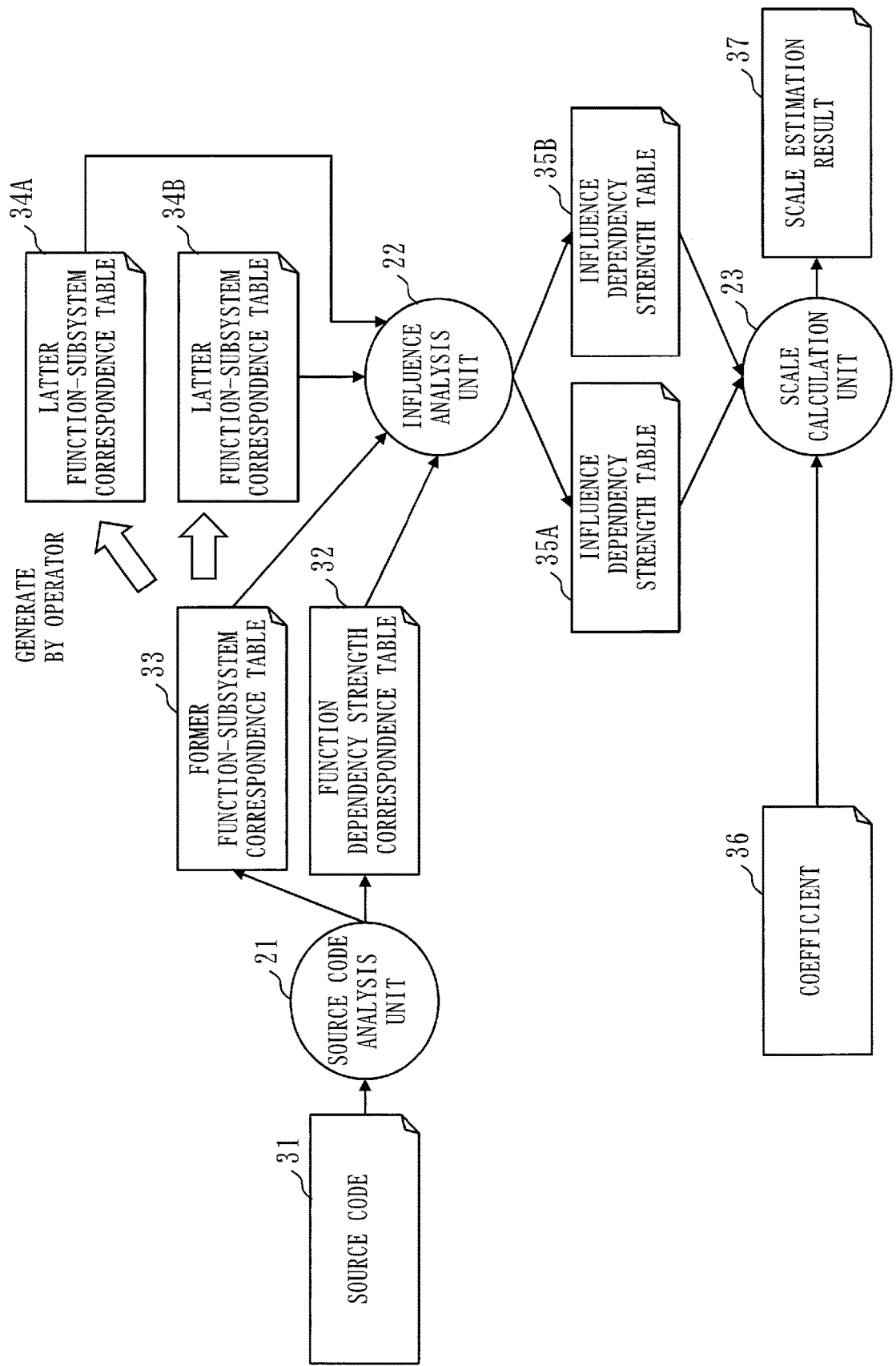
FIG. 17 is a diagram illustrating operation flows of a scale calculation apparatus 10 according to a fourth embodiment.

FIG. 17 illustrates an example where the scale of the refactoring is calculated for each of two refactoring patterns that are a pattern A and a pattern B.

<Processes of Influence Analysis Unit 22>

The influence analysis unit 22 identifies, for each of the plurality of refactoring patterns, one or more transfer functions that will each move to a different subsystem due to the refactoring for a target pattern. Then, the influence analysis unit 22 generates an influence dependency strength table 35 indicating a dependency strength to be influenced by the refactoring for the target pattern, based on dependency strengths that have been identified by the source code analysis unit 21 with respect to the one or more transfer functions.

Specifically, the influence analysis unit 22 compares the former function-subsystem correspondence table 33 and a latter function-subsystem correspondence table 34 of the target pattern, thereby identifying the one or more transfer functions with respect to the target pattern. Then, the influence analysis unit 22 identifies the dependency strength to be influenced by the refactoring with respect to the one or more transfer functions based on the function dependency strength correspondence table 32, thereby generating the influence dependency strength table 35 with respect to the target pattern.

In the case of the example in FIG. 17, the influence analysis unit 22 compares the former function-subsystem correspondence table 33 with a latter function-subsystem correspondence table 34A, thereby identifying one or more transfer functions with respect to the pattern A. Then, the influence analysis unit 22 identifies a dependency strength to be influenced by the refactoring with respect to the identified one or more transfer functions, based on the function dependency strength correspondence table 32, thereby generating an influence dependency strength table 35A with respect to the pattern A. Similarly, the influence analysis unit 22 compares the former function-subsystem correspondence table 33 with a latter function-subsystem correspondence table 34B, thereby identifying one or more transfer functions with respect to the pattern B. Then, the influence analysis unit 22 identifies a dependency strength to be influenced by the refactoring with respect to the identified one or more transfer functions, based on the function dependency strength correspondence table 32, thereby generating an influence dependency strength table 35B with respect to the pattern B.

<Processes of Scale Calculation unit 23>

The scale calculation unit 23 calculates, for each of the plurality of refactoring patterns, the scale of the refactoring for the target pattern, based on the dependency strength to be influenced, which has been identified by the influence analysis unit 22. Then, the scale calculation unit 23 generates a scale estimation result 37 indicating the scale of the refactoring for each pattern.

The scale calculation unit 23 may generate a scale estimation result 37 indicating only the scale with respect to the pattern of a largest scale or a smallest scale.

\*\*\*Effect of Fourth Embodiment\*\*\*

As mentioned above, the scale calculation apparatus 10 according to the fourth embodiment calculates the scale of the refactoring for each of the plurality of refactoring patterns. This enables study of which refactoring pattern can be executed with a smallest number of manhours.

\*\*\*Alternative Configuration\*\*\*

Third Variation Example

In the second embodiment, the effect of the refactoring for one refactoring pattern has been calculated. The second embodiment and the fourth embodiment may be combined to calculate the effect of refactoring for each of a plurality of refactoring patterns.

In this case, the effect calculation unit 24 calculates, for each of the plurality of refactoring patterns, the effect of the refactoring for a target pattern based on the dependency strengths between the respective subsystems before refactoring and dependency strengths between the respective subsystems after the refactoring for the target pattern.

Fourth Variation Example

In the third embodiment, the scale of the refactoring for each function has been calculated, for one refactoring pattern. The third embodiment and the fourth embodiment may be combined to calculate the scale of refactoring for each function, for each of a plurality of refactoring patterns.

In this case, the influence analysis unit 22 identifies, for each of the plurality of refactoring patterns, one or more transfer functions that will each move to a different subsystem due to the refactoring for a target pattern. Then, the influence analysis unit 22 identifies, for each transfer function that has been identified with respect to the refactoring for the target pattern, a dependency strength to be influenced by the refactoring for the target pattern. The scale calculation unit 23 calculates, for each of the plurality of patterns and for each transfer function that has been identified with respect to the refactoring for the target pattern, the scale of the refactoring for the target pattern with respect to the transfer function, based on the dependency strength to be influenced with respect to the transfer function.

REFERENCE SIGNS LIST

10: scale calculation apparatus; 11: processor; 12: memory; 13: storage; 14: communication interface; 15: processing circuit; 21: source code analysis unit; 22: influence analysis unit; 23: scale calculation unit; 24: effect calculation unit; 31: source code; 32: function dependency strength correspondence table; 33: former function-subsystem correspondence table; 34: latter function-subsystem correspondence table; 35: influence dependency strength table; 36: coefficient; 37: scale estimation result; 38: former inter-subsystem dependency table; 39: latter inter-subsystem dependency table; 40: effect estimation result; 41: function influence dependency strength table; 42: function scale estimation result

The invention claimed is:

1. A scale calculation apparatus comprising:
processing circuitry to:
identify a dependency causing strength by which each function depends on a different function and a caused dependency strength by which each function is depended by a different function, as dependency strengths of one or more functions included in a source code;
identify one or more transfer functions that will each move to a different subsystem due to refactoring and identify a dependency strength to be influenced by the refactoring, based on the dependency causing strength and the caused dependency strength that have been identified with respect to the one or more transfer functions; and
calculate a scale of the refactoring, based on the identified dependency strength to be influenced.

2. The scale calculation apparatus according to claim 1, wherein the processing circuitry:
identifies, as the dependency strength to be influenced, a total of dependency causing strengths and a total of caused dependency strengths that have been identified with respect to the one or more transfer functions, and multiplies by a dependency causing coefficient, the total of the dependency causing strengths and multiplies by a caused dependency coefficient, the total of the caused dependency strengths, thereby calculating the scale of the refactoring.

3. The scale calculation apparatus according to claim 1, wherein the processing circuitry calculates an effect of the refactoring, based on dependency strengths between respective subsystems before the refactoring and dependency strengths between respective subsystems after the refactoring.

4. The scale calculation apparatus according to claim 3, wherein the processing circuitry calculates, for each of a plurality of refactorings that are targeted, an effect of the targeted refactoring, based on the dependency strengths between the respective subsystems before the refactorings and dependency strengths between the respective subsystems after the targeted refactoring.

5. The scale calculation apparatus according to claim 1, wherein the processing circuitry identifies, for each of the one or more transfer functions, a dependency strength to be influenced by the refactoring, and
calculates, for each of the one or more transfer functions, a scale of the refactoring with respect to the transfer function, based on the dependency strength to be influenced with respect to the transfer function.

6. The scale calculation apparatus according to claim 5, wherein the processing circuitry identifies, for each of a plurality of refactorings that are targeted, identifies one or more transfer functions that will each move to a different subsystem due to the targeted refactoring, and identifies a dependency strength to be influenced by the target refactoring, for each of the one or more transfer functions that have been identified with respect to the targeted refactoring, and
calculates, for each of the plurality of refactorings that are targeted and for each of the one or more transfer functions that have been identified with respect to the targeted refactoring, a scale of the targeted refactoring with respect to the transfer function, based on the dependency strength to be influenced with respect to the transfer function.

7. The scale calculation apparatus according to claim 1, wherein the processing circuitry identifies, for each of a plurality of refactorings that are targeted, one or more transfer functions that will each move to a different subsystem due to the targeted refactoring and identifies a dependency strength to be influenced by the targeted refactoring, and
calculates, for each of the plurality of refactorings that are targeted, a scale of the targeted refactoring, based on the dependency strength to be influenced by the targeted refactoring.

8. A non-transitory computer readable medium storing a scale calculation program to cause a computer to execute:
a source code analysis process of identifying a dependency causing strength by which each function depends on a different function and a caused dependency strength by which each function is depended by a different function, as dependency strengths of one or more functions included in a source code;
an influence analysis process of identifying one or more transfer functions that will each move to a different subsystem due to refactoring and identifying a dependency strength to be influenced by the refactoring, based on the dependency causing strength and the caused dependency strength that have been identified by the source analysis process with respect to the one or more transfer functions; and a scale calculation process of calculating a scale of the refactoring, based on the dependency strength to be influenced, which has been identified by the influence analysis process.

9. A scale calculation apparatus comprising:

processing circuitry to:

identify dependency strengths of one or more functions included in a source code;

identify, from one or more functions associated with a first subsystem, one or more transfer functions that has each moved to a second subsystem due to refactoring, and identify a dependency strength that is influenced by the refactoring in an interface that has a dependency relationship with the one or more transfer functions, based on the dependency strengths that have been identified with respect to the one or more transfer functions; and calculate a scale of change in the interface due to the refactoring, based on the identified dependency strength that is influenced.

10. The scale calculation apparatus according to claim 9, wherein the processing circuitry calculates a scale of the refactoring, based on a correlation with the identified dependency strength that is influenced.

11. The scale calculation apparatus according to claim 9, wherein the processing circuitry identifies a dependency strength that is influenced by the refactoring in an interface, having a dependency relationship with the one or more transfer functions, of each of the first subsystem and the second subsystem.

12. The scale calculation apparatus according to claim 10, wherein the processing circuitry identifies a dependency strength that is influenced by the refactoring in an interface, having a dependency relationship with the one or more transfer functions, of each of the first subsystem and the second subsystem.

13. A non-transitory computer readable medium storing a scale calculation program to cause a computer to execute:

a source code analysis process of identifying dependency strengths of one or more functions included in a source code;

an influence analysis process of identifying, from one or more functions associated with a first subsystem, one or more transfer functions that has each moved to a second subsystem due to refactoring, and identifying a dependency strength that is influenced by the refactoring in an interface that has a dependency relationship with the one or more transfer functions, based on the dependency strengths that have been identified with respect to the one or more transfer functions; and a scale calculation process of calculating a scale of change in the interface due to the refactoring, based on the identified dependency strength that is influenced.

* * * * *